United States Patent
Yasunori

(10) Patent No.: US 10,343,632 B2
(45) Date of Patent: Jul. 9, 2019

(54) AUTOMOBILE POWER SUPPLY DEVICE

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventor: Hiromichi Yasunori, Mie (JP)

(73) Assignees: AutoNetworks Technologies, Ltd., Yokkaichi, Mie (JP); Sumitomo Wiring Systems, Ltd., Yokkaichi, Mie (JP); Sumitomo Electric Industries, Ltd., Osaka-Shi (JP)

( * ) Notice: Subject to any disclaimer, the term of this patent is extended or adjusted under 35 U.S.C. 154(b) by 0 days.

(21) Appl. No.: 15/894,049

(22) Filed: Feb. 12, 2018

(65) Prior Publication Data
US 2018/0162300 A1    Jun. 14, 2018

Related U.S. Application Data

(62) Division of application No. 15/515,215, filed as application No. PCT/JP2015/076025 on Sep. 14, 2015, now Pat. No. 10,086,783.

(30) Foreign Application Priority Data

Sep. 30, 2014 (JP) ................................. 2014-200701
Sep. 30, 2014 (JP) ................................. 2014-200703

(51) Int. Cl.
*B60R 16/03* (2006.01)
*B60R 16/04* (2006.01)
(Continued)

(52) U.S. Cl.
CPC ............ *B60R 16/03* (2013.01); *B60L 3/0069* (2013.01); *B60R 16/04* (2013.01); *H01R 13/70* (2013.01);
(Continued)

(58) Field of Classification Search
CPC ...... B60R 16/04; H01M 2/10; H01M 2220/20; H01M 2200/20; H01M 2/20
See application file for complete search history.

(56) References Cited

U.S. PATENT DOCUMENTS 6,130,614 A * 10/2000 Miller ..................... E05B 83/26
340/425.5
8,905,770 B2   12/2014 Fujiwara
(Continued)

FOREIGN PATENT DOCUMENTS

JP    H10-184507 A    7/1998
JP    2000-289543 A   10/2000
(Continued)

OTHER PUBLICATIONS

Search Report for International Application No. PCT/JP2015/076025, dated Dec. 15, 2015, 4 pp.

*Primary Examiner* — James A Shriver, II
*Assistant Examiner* — James J Triggs
(74) *Attorney, Agent, or Firm* — Honigman LLP

(57) ABSTRACT

An automobile power supply device is provided with a first relay interposed between a first battery and a load group; a second relay interposed between second battery and the load group; a hood switch that detects the opening of a hood of an engine room and outputs a detection signal dt1; a luggage switch that detects the opening of a hood of a luggage room and outputs a detection signal dt2; and a power supply control unit that brings the first relay into a non-conductive state based on the detection signal output by the hood switch, and brings the second relay into a non-conductive
(Continued)

state based on the detection signal output by the luggage switch.

12 Claims, 6 Drawing Sheets

(51) Int. Cl.
　　　*H02J 7/00*　　　(2006.01)
　　　*B60L 3/00*　　　(2019.01)
　　　*H01R 13/70*　　(2006.01)
　　　*H02H 1/06*　　　(2006.01)
　　　*H02J 7/34*　　　(2006.01)
(52) U.S. Cl.
　　　CPC ............. *H02H 1/06* (2013.01); *H02J 7/00* (2013.01); *H02J 7/34* (2013.01)

(56) References Cited

U.S. PATENT DOCUMENTS

| | | |
|---|---|---|
| 9,397,429 B2 * | 7/2016 | Kim ................. H01R 13/707 |
| 2009/0039707 A1 | 2/2009 | Ishizeki |
| 2013/0045633 A1 | 2/2013 | Murakami et al. |
| 2013/0065412 A1 | 3/2013 | Ikeda et al. |

FOREIGN PATENT DOCUMENTS

| | | |
|---|---|---|
| JP | 2003-017198 A | 1/2003 |
| JP | 2007-259645 A | 10/2007 |
| JP | 2009-012728 A | 1/2009 |
| JP | 2011-166993 A | 8/2011 |
| JP | 2013-062043 A | 4/2013 |
| JP | 2013-161576 A | 8/2013 |

* cited by examiner

Unlocke

AUTOMOBILE POWER SUPPLY DEVICE

CROSS-REFERENCE TO RELATED APPLICATIONS

This application is a divisional application of U.S. application Ser. No. 15/515,215 filed on Mar. 29, 2017 which is the U.S. national stage of PCT/JP2015/076025 filed Sep. 14, 2015, which claims priority of Japanese Patent Application No. JP 2014-200701 filed Sep. 30, 2014 and Japanese Patent Application No. JP 2014-200703 filed Sep. 30, 2014.

TECHNICAL FIELD

The present disclosure relates to an automobile power supply device in which a plurality of batteries can supply electric power to multiple loads.

BACKGROUND

FIG. 1 shows an example of an automobile power supply device in which two batteries can supply electric power to a group of loads. A load group 1 is connected to positive terminals of a first battery 2 and a second battery 3, and is supplied with electric power from at least one of the first battery 2 and the second battery 3. With such a configuration, even if one of the first battery 2 and the second battery 3 fails, the load group 1 is supplied with electric power from the other battery that has not failed, and thus redundancy of the power supply is secured.

In the above-described automobile power supply device, if, for example, the second battery 3 fails and needs to be replaced, connection plugs 6 and 7 are disengaged from connection terminals 4 and 5 of the second battery 3, and the battery that has failed is replaced by a new battery. Even during such a replacement operation, the load group 1 continues to be supplied with electric power from the first battery 2, and can thus perform a normal operation.

Automobile power supply devices may be provided with a power supply wiring for supplying electric power to various loads from batteries, and a connector that is disposed in the power supply wiring. When replacing a battery, an operator disengages the connector prior to disengaging the battery.

Modern automobiles use loads that need a power supply voltage of, for example, 48V that is higher than an ordinary voltage of 12V or 24V, and are provided with a battery for outputting a DC voltage of 48V to supply electric power to the loads. In conventional automobile power supply devices, when a connector is disengaged while electric power is supplied from the battery to the loads, arc discharge may occur between connector terminals that are being separated, and the connector terminals may be broken.

Accordingly, a power supply apparatus has been proposed in which arc discharge is prevented from occurring in the connector by an operator manually disengaging a service plug prior to disengaging a connector so as to interrupt the supply of electric power from a battery to loads. Furthermore, Patent JP 2003-17198A discloses a service plug that can extinguish, within a short time, an arc that occurs when a connection electrode and a shorting member are separated from each other. JP 2013-62043A discloses a locking device that reliably holds a connector in an engaged state using a catching part that elastically engages the connector.

In the example of FIG. 1, during a replacement operation, the connection plug 6 still continues to be supplied with electric power from the first battery 2, and thus if the connection plug 6 is placed in contact with the connection plug 7, a vehicle body, or the like by mistake, a spark may occur in the contact portion or the power supply wiring 8 may burn out, due to an earth fault.

JP 2009-12728A discloses a power supply apparatus that is provided with a battery and a capacitor, and has a configuration in which, in cases of over-discharge of the battery, power supply from the capacitor is interrupted. However, JP 2009-12728A does not disclose a configuration that supplies electric power to a load group during an operation for replacing the battery, while preventing occurrence of a spark or the like that may occur due to an earth fault.

In the power supply apparatus disclosed in JP 2003-17198A, if an operator has forgot to disengage the service plug before the replacement of a battery, and disengages a connector, arc discharge may occur between connector terminals.

It is an object of the present invention to provide an automobile power supply device in which a battery replacement operation can be performed safely.

SUMMARY OF INVENTION

According to one aspect of the present invention, an automobile power supply device is provided with a first battery that is disposed in an engine room, a second battery that is disposed in a luggage room, and a load group that is supplied with electric power from the first battery and the second battery, the automobile power supply device including: first opening and closing means that is interposed between the first battery and the load group; second opening and closing means that is interposed between the second battery and the load group; a hood switch that is configured to detect opening of a hood of the engine room, and output a detection signal; a luggage switch that is configured to detect opening of a hood of the luggage room, and output a detection signal; and a power supply control unit that is configured to bring the first opening and closing means into a non-conductive state based on the detection signal output by the hood switch, and to bring the second opening and closing means into a non-conductive state based on the detection signal output by the luggage switch.

According to this configuration, when the hood of the engine room or the hood of the luggage room is open, the connection between the first battery and the second battery is interrupted.

In the automobile power supply device, preferably, the power supply control unit is supplied with electric power from the first battery and the second battery via the first opening and closing means and the second opening and closing means.

According to this configuration, even if one of the first opening and closing means and the second opening and closing means is in the non-conductive state, the power supply control unit is supplied with electric power from the other one of the first battery and the second battery.

In the automobile power supply device, preferably, the first opening and closing means is provided in a power supply box that is arranged in the engine room.

According to this configuration, the connection of the first battery to the second battery is interrupted in the power supply box that is located in the vicinity of the first battery.

In the automobile power supply device, preferably, the second opening and closing means is provided in a power supply box that is arranged in the luggage room.

According to this configuration, the connection of the second battery to the first battery is interrupted in the power supply box that is located in the vicinity of the second battery.

In the automobile power supply device, preferably, the first opening and closing means and the second opening and closing means are each constituted by a relay whose contact is configured to be brought into the non-conductive state based on a control signal that is output from the power supply control unit.

According to this configuration, the contact of the relay is controlled to be in the non-conductive state by the power supply control unit, and the connection between the first battery and the second battery is interrupted.

Another aspect of the present invention is directed to an automobile power supply device in which a load group is supplied with electric power from a battery via opening and closing means and a connector, the automobile power supply device including: a locking device that is provided on the connector, and is configured to hold the connector in a normally connected state; a detection unit that is provided on the locking device, and is configured to detect an operation of the locking device; and a power supply control unit that is configured to control the opening and closing means to be in a conductive state based on a detection signal that is output from the detection unit.

According to this configuration, the connector is supplied with electric power from the battery based on the operation of the locking device, thus preventing an arc from occurring when the connector is disengaged.

In the automobile power supply device, preferably, the detection unit is provided with a detection piece configured to establish conduction between detection terminals of the connector when the locking device operates, and the power supply control unit is provided with: a signal detection circuit configured to detect conduction between the detection terminals; and a main control unit configured to control the opening and closing means to be in the conductive state based on the detection signal that is output from the signal detection circuit.

According to this configuration, when the locking device operates, conduction is established between the detection terminals of the connector, the conduction thereof is detected by the signal detection circuit, and the opening and closing means is brought into the conductive state by the main control unit based on the detection signal.

In the automobile power supply device, preferably, a plurality of connectors are connected in parallel to an output terminal of the opening and closing means, and supply electric power to a plurality of load groups, and the main control unit controls the opening and closing means to be in the conductive state if a plurality of detection units of the plurality of connectors detect operations of locking devices at the same time.

According to this configuration, when the plurality of connectors are in the locked state, the opening and closing means is in the conductive state, and the load groups are supplied with electric power.

In the automobile power supply device, preferably, the opening and closing means is constituted by a relay whose contact is interposed between the battery and the connector.

According to this configuration, when an operation of a locking device is detected, the contact of the relay is brought into the conductive state, and the load group is supplied with electric power from the battery.

In the automobile power supply device, preferably, the power supply control unit is provided with an abnormality detection unit configured to detect an abnormal operation of the relay based on an output voltage that is output when the relay is controlled to be open or closed.

According to this configuration, an abnormal operation of the relay is detected.

In the automobile power supply device, preferably, the output voltage of the battery is larger than 36V and less than 60V.

According to this configuration, when the connector is disengaged, an arc is prevented from occurring at a battery voltage at which an arc is likely to occur.

According to the automobile power supply device as per some aspects of the present invention, it is possible to perform a battery replacement operation safely. Other aspects and advantages of the present invention will become apparent from the following description together with the drawings showing the technical ideas of the present invention.

DETAILED DESCRIPTION OF THE PREFERRED EMBODIMENTS

Figure 1:
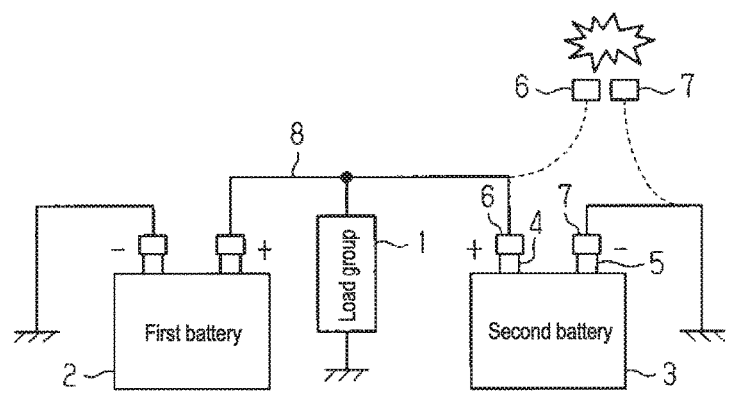
FIG. 1 is a diagram schematically illustrating an automobile power supply device according to a conventional example.
Figure 2:
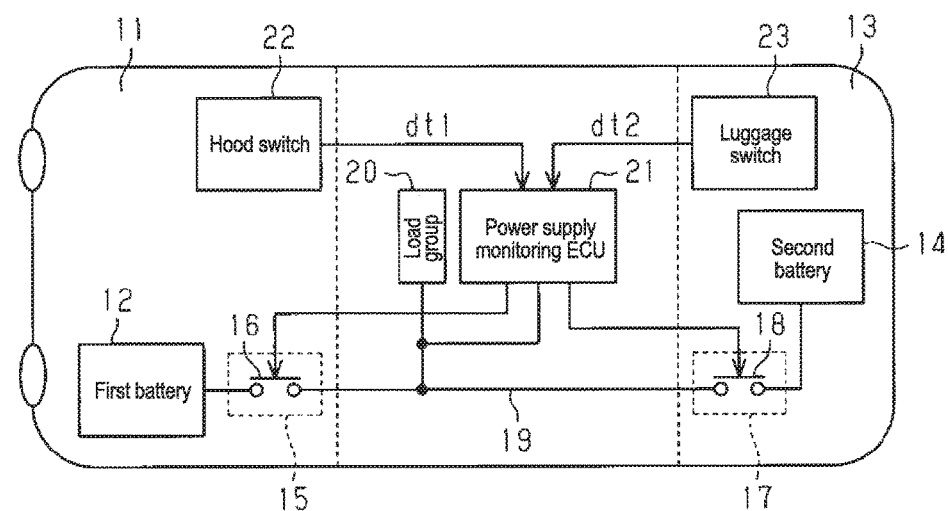
FIG. 2 is a diagram schematically illustrating an automobile power supply device according to a first embodiment.

Hereinafter, an automobile power supply device according to a first embodiment will be described with reference to FIGS. 2 and 3. As shown in FIG. 2, a first battery 12 is disposed in an engine room 11 in a front section of a vehicle, and a second battery 14, which is different from the first battery 12, is disposed in a luggage room 13 in a rear section of the vehicle. The first battery 12 is configured by, for example, a lead storage battery. The second battery 14 is configured by, for example, a capacitor.

A power supply wiring 19, a first relay 16, and a second relay 18 are provided between the first battery 12 and the second battery 14.

The first relay 16 is arranged, together with a fuse (not shown) or the like, in a power supply box 15 that is disposed, for example, in the vicinity of the first battery 12 in the engine room 11.

The second relay 18 is arranged, together with a fuse (not shown) or the like, in a power supply box 17 that is disposed, for example, in the vicinity of the second battery 14 in the luggage room 13. The first and second batteries 12 and 14 are connected to each other via the power supply wiring 19 and contacts of the first and second relays 16 and 18.

A load group 20 and a power supply control unit 21 are connected to the power supply wiring 19 laid between the first and second relays 16 and 18. When the contacts of the first and second relays 16 and 18 are in a conductive state, the load group 20 and the power supply control unit 21 are supplied with electric power from the first and second batteries 12 and 14. The power supply control unit 21 may also be referred to as "power supply monitoring ECU", and may be a microcomputer including a processor and a memory.

The engine room 11 is provided with a hood switch 22 for detecting opening of a hood of the engine room 11, and a detection signal dt1 of the hood switch 22 is output to the power supply control unit 21.

The luggage room 13 is provided with a luggage switch 23 for detecting opening of a hood of the luggage room 13, and a detection signal dt2 of the luggage switch 23 is output to the power supply control unit 21.

The power supply control unit 21 can output an excitation signal to exciting coils of the first and second relays 16 and 18. The power supply control unit 21 is configured to output, upon receiving the detection signal dt1 from the hood switch 22, the excitation signal to the first relay 16 so as to bring the contact of the first relay 16 into a non-conductive state.

Furthermore, the power supply control unit 21 is configured to output, upon receiving the detection signal dt2 from the luggage switch 23, the excitation signal to the second relay 18 so as to bring the contact of the second relay 18 into a non-conductive state.

The following will describe functions of the automobile power supply device.

In a normal state in which the hoods of the engine room 11 and the luggage room 13 are closed, no detection signals dt1 and dt2 are output from the hood switch 22 and the luggage switch 23 to the power supply control unit 21.

In this state, the contacts of the first and second relays 16 and 18 are maintained in a conductive state, and the load group 20 and the power supply control unit 21 are supplied with electric power from at least one of the first and second batteries 12 and 14.

Figure 3:
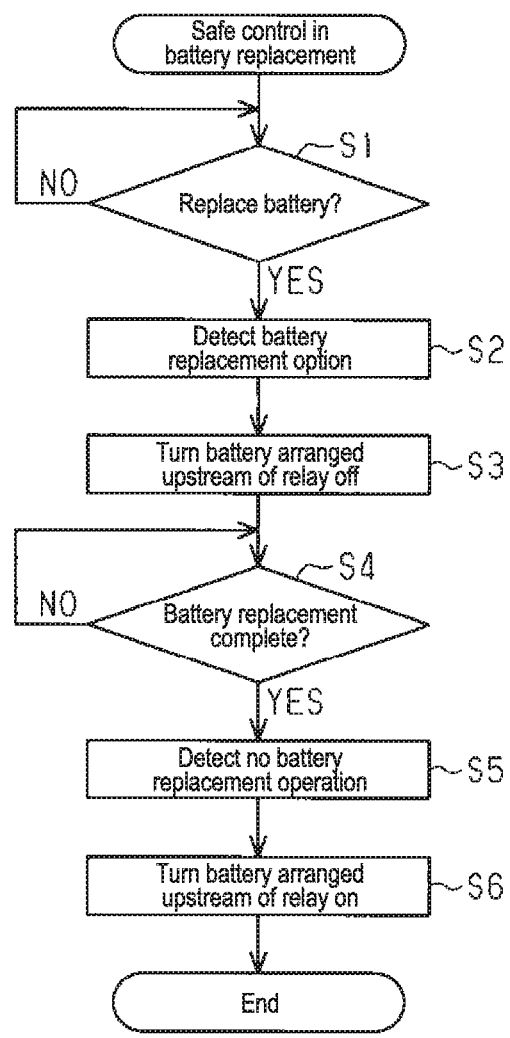
FIG. 3 is a flowchart illustrating an operation of the automobile power supply device.

As shown in FIG. 3, in such a normal state, the power supply control unit 21 determines whether or not a battery replacement operation has started, that is, whether or not one of the detection signals dt1 and dt2 that are respectively generated based on opening of the hood of the engine room 11 and the hood of the luggage room 13 has been input (step S1).

Here, if a need arises to replace the first battery 12, and the hood of the engine room 11 is opened, the detection signal dt1 is output from the hood switch 22 to the power supply control unit 21.

Accordingly, the power supply control unit 21 detects an operation of replacing the battery (step S2), and brings the contact of the first relay 16 in the vicinity of the first battery 12 into the non-conductive state (step S3). The power supply control unit 21 waits until the hood of the engine room 11 is closed, and receiving the detection signal dt1 is discontinued (step S4).

In this state, the connection between the first battery 12 and the second battery 14 is interrupted. Therefore, even if a plug connected to a positive terminal of the first battery 12 is placed in contact with a vehicle body or a plug connected to a negative terminal of the first battery 12 during the operation of replacing the first battery 12, no spark will occur or no earth fault current will flow.

When the operation of replacing the first battery 12 ends, and the hood of the engine room 11 is closed, the power supply control unit 21 detects the discontinuation of receiving the detection signal dt1 (step S5). The power supply control unit 21 brings the contact of the first relay 16 back into the conductive state (step S6). Thus, the control in replacing the battery ends.

If a need arises to replace the second battery 14, the detection signal dt2 generated based on the opening of the hood of the luggage room 13 is output from the luggage switch 23 to the power supply control unit 21.

Accordingly, the power supply control unit 21 brings the contact of the second relay 18 into the non-conductive state, and the connection between the first battery 12 and the second battery 14 is interrupted (steps S1 to S3). Accordingly, it is possible to perform a safe operation of replacing the second battery 14.

Then, when the replacement of the second battery 14 ends, the hood of the luggage room 13 is closed, and receiving the detection signal dt2 is discontinued, and the contact of the second relay 18 returns to the conductive state (steps S4 to S6).

Opening the hood of the engine room 11 is a preceding event that is performed prior to an event of electrically and physically separating the first battery 12 from the power supply wiring 19. The hood switch 22 can function as a preceding event sensor that detects this preceding event. Similarly, opening the hood of the luggage room 13 is also a preceding event that is performed prior to an event of electrically and physically separating the second battery 14 from the power supply wiring 19. The luggage switch 23 can also function as a preceding event sensor that detects this preceding event. The detection signals dt1 and dt2 may be referred to as "preceding event detection signals".

The automobile power supply device of the first embodiment can achieve, in addition to the functions and effects of the conventional technique, the following effects:

1) During an operation of replacing the first battery 12, it is possible to interrupt the connection between the first battery 12 and the second battery 14. Accordingly, it is possible to perform the operation of replacing the first battery 12 safely.

2) During an operation of replacing the second battery 14, it is possible to interrupt the connection between the first battery 12 and the second battery 14. Accordingly, it is possible to perform the operation of replacing the second battery 14 safely.

3) During the operation of replacing the first battery 12, the second battery 14 can supply electric power to the load group 20 and the power supply control unit 21, and thus the load group 20 and the power supply control unit 21 can perform a normal operation during the operation of replacing the first battery 12.

4) During the operation of replacing the second battery 14, the first battery 12 can supply electric power to the load group 20 and the power supply control unit 21, and thus the load group 20 and the power supply control unit 21 can perform a normal operation during the operation of replacing the second battery 14.

5) Using the hood switch 22 for detecting opening of the hood of the engine room 11, it is possible to easily recognize the start of the operation of replacing the first battery 12.

6) Using the luggage switch 23 for detecting opening of the hood of the luggage room 13, it is possible to easily recognize the start of the operation of replacing the second battery 14.

Note that the first embodiment may be modified as follows.

In the first embodiment, if the hoods of both the engine room 11 and the luggage room 13 are opened, it may be provided that the corresponding relay is not opened by the hood that has been opened later. With this, the supply of electric power to the load group 20 and the power supply control unit 21 is not interrupted.

The first and second batteries 12 and 14 may be a lead storage battery or a capacitor.

Hereinafter, an automobile power supply device according to a second embodiment will be described with reference to the drawings.

Figure 4:
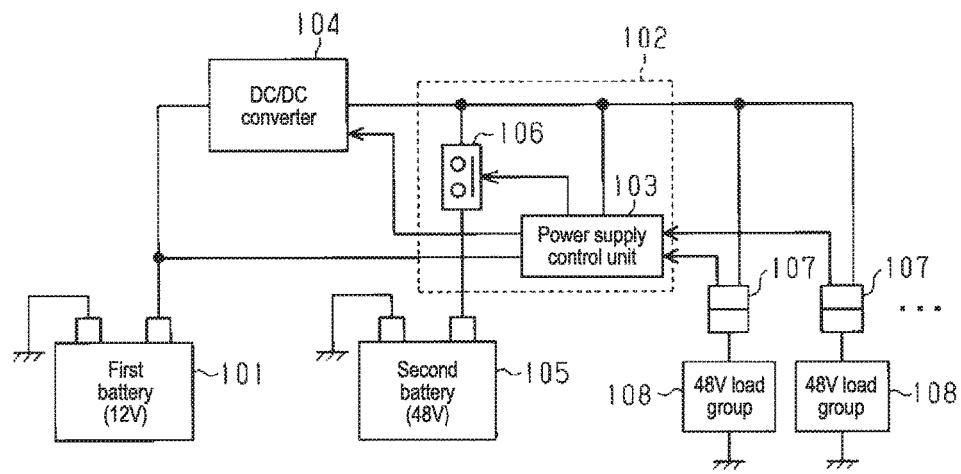
FIG. 4 is a diagram schematically illustrating an automobile power supply device according to a second embodiment.

As shown in FIG. 4, a first battery 101, and a second battery 105, which is different from the first battery 101, supply electric power to a plurality of load groups 108 via a power supply wiring 120. The first battery 101 outputs a DC voltage of, for example, 12V. The second battery 105 outputs a DC voltage of, for example, 48V. Each load group 108 can include at least one load, and may be, for example, a 48V load group. A positive terminal of the first battery 101 is connected to an input/output terminal of a power supply control unit 103 disposed in a power supply box 102 and to an input/output terminal of a DC/DC converter 104.

A DC voltage of 48V that is output from the second battery 105 is supplied to the plurality of 48V load groups 108 via contacts of a relay 106 and connectors 107. Furthermore, a positive terminal of the second battery 105 is connected to another input/output terminal of the power supply control unit 103 and another input/output terminal of the DC/DC converter 104 via the contact of the relay 106. Also, the DC/DC converter 104 can lower the DC voltage that is supplied from the second battery 105 from 48V to 12V, and can supply the lowered DC voltage to the first battery 101. Furthermore, when the contact of the relay 106 is brought into the non-conductive state, and the DC voltage of 48V is not supplied from the second battery 105 to the 48V load groups 108, the DC/DC converter 104 raises the DC voltage that is supplied from the first battery 101 from 12V to 48V, and can supply the raised DC voltage to the 48V load groups 108.

Each connector 107 is provided with a locking device 107a (see FIG. 6) that holds the connector 107 in an engaged state. As described in JP 2013-62043A for example, the locking device 107a may be a device that reliably holds the connector 107 in the engaged state by using a catching part that elastically engages the connector 107.

Figure 6:
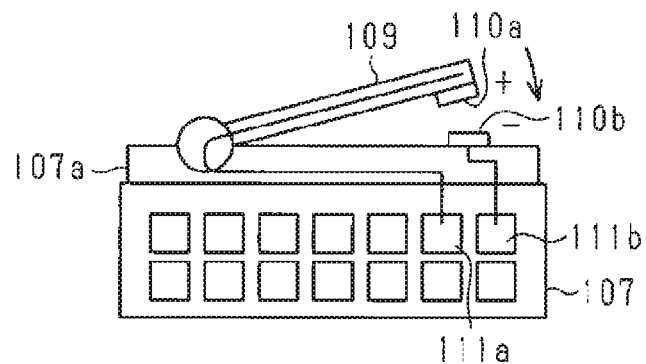
FIG. 6 is a diagram schematically illustrating a locked-state detection unit.

Furthermore, as shown in FIG. 6, the locking device 107a is provided with a detection piece 109 for detecting an operation of the locking device 107a, the detection piece 109 serving as a locked-state detection unit. When the locking device 107a is operated, the detection piece 109 is pressed in the arrow direction to cause a contact 110a to abut against a contact 110b, establishing conduction between detection terminals 111a and 111b of the connector 107.

Figure 5:
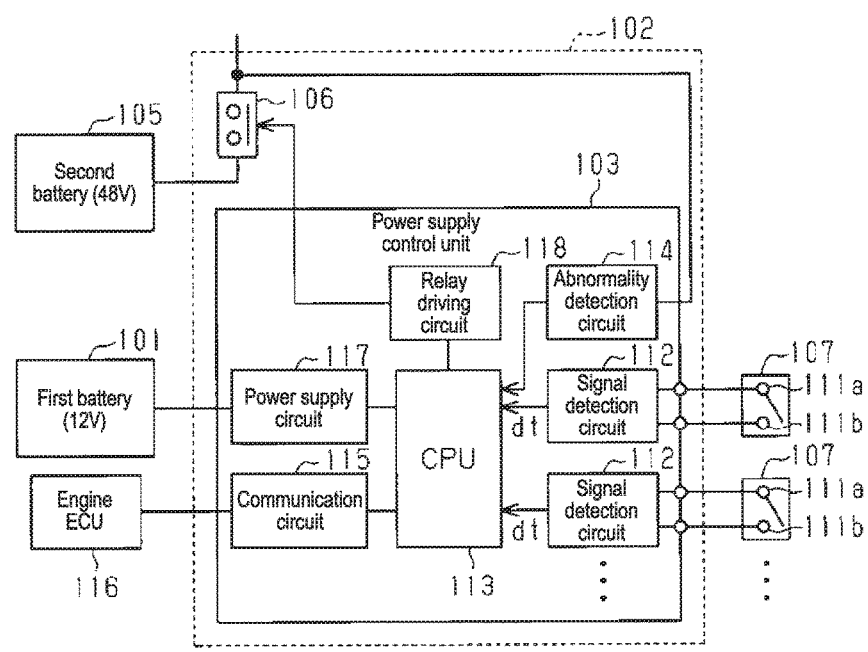
FIG. 5 is a block diagram illustrating a power supply control unit.
Figure 8:
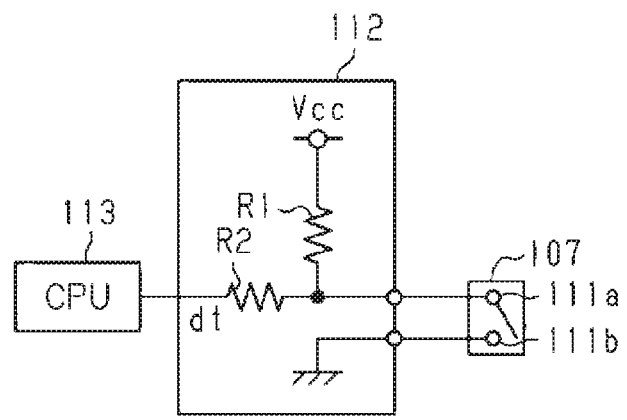
FIG. 8 is a circuit diagram illustrating a signal detection circuit.

The configuration of the power supply control unit 103 will be described with reference to FIG. 5. The detection terminals 111a and 111b of the plurality of connectors 107 are connected to signal detection circuits 112 provided within the power supply control unit 103. As shown in FIG. 8, the detection terminal 111a is connected to a node, in each signal detection circuit 112, that is arranged between resistors R1 and R2, which are connected between a power supply Vcc and a CPU 113, and the detection terminal 111b is connected to a ground GND in the signal detection circuit 112.

With such a configuration, when the locking device 107a of the connector 107 is not locked, the contacts 110a and 110b are not in contact with each other, and there is no conduction between the detection terminals 111a and 111b. In this state, the detection signal dt that is input to the CPU 113 has an "H" level, that is, a level that is substantially equal to the power supply Vcc.

On the other hand, when the locking device 107a of the connector 107 is engaged so as to be in the locked state, and the contacts 110a and 110b are in contact with each other, the potential between the resistors R1 and R2 has a level that is substantially equal to the ground GND, and the detection signal dt that is input to the CPU 113 has an "L" level, that is, a level that is substantially equal to the ground GND.

Upon detecting the detection signal dt of the "L" level, the CPU 113 drives a relay driving circuit 118, and brings the contact of the relay 106 into the conductive state. Upon detecting the detection signal dt of the "H" level, the CPU 113 brings the contact of the relay 106 into the non-conductive state.

An abnormality detection circuit 114 is connected to the relay 106, and is configured to monitor an output voltage of the relay 106, and to output the monitored voltage to the CPU 113. The CPU 113 detects whether or not the relay 106 operates normally based on the monitored value, and if it is determined that the relay 106 does not operate normally, the CPU 113 outputs an abnormality signal to an engine ECU 116 via a communication circuit 115.

The circuits provided within the power supply control unit 103 are supplied with a DC voltage of 12V serving as electric power from the first battery 101 via a power supply circuit 117.

Hereinafter, functions of the automobile power supply device that has the above-described configuration will be described.

Figure 9:
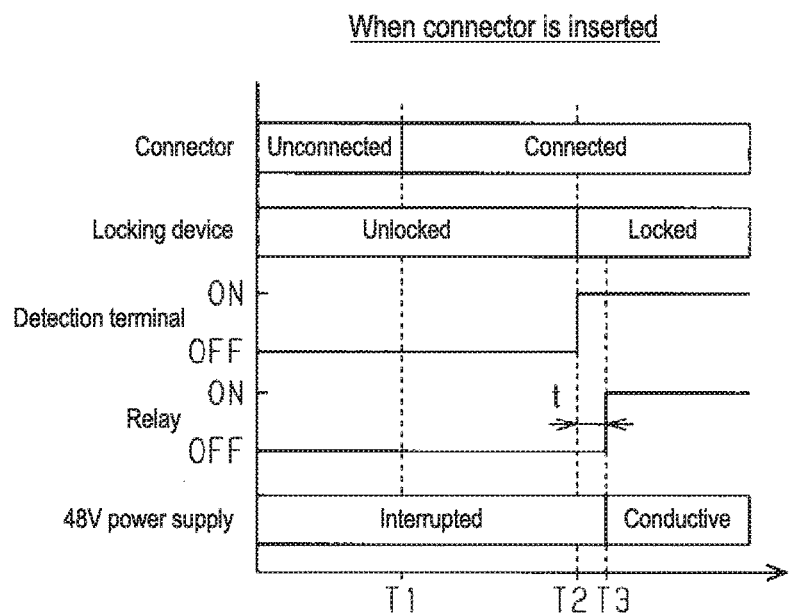
FIG. 9 is a timing chart illustrating an operation of the automobile power supply device.

The following will describe an operation that is performed when a connector 107 is engaged and brought into a connected state from an unconnected state with reference to FIG. 9. Prior to a time T1, the connector 107 is in the unconnected state, and there is no conduction between the detection terminals 111a and 111b of the connector 107 (off state). In this state, the detection signal dt that is output from the signal detection circuit 112 has the "H" level, and the CPU 113 maintains the contact of the relay 106 in the non-conductive state.

At the time T1, the connector 107 in this state is connected, but the locking device 107a is in an unlocked state and there is still no conduction between the detection terminals 111a and 111b.

Then, when, at a time T2, the locking device 107a is brought into a locked state, conduction is established between the detection terminals 111a and 111b, and the detection signal dt that is output from the signal detection circuit 112 takes on the "L" level. The CPU 113 determines the change in the detection signal dt, and controls the contact of the relay 106 to take on the conductive state at a time T3 when a determination time t has elapsed. As a result, the 48V load groups 108 are supplied with electric power from the second battery 105. The determination time t is a time period that is needed for the CPU 113 to determine a change in the detection signal dt.

An operation of disengaging the connected connector 107 and bringing the connector 107 into the unconnected state will be described with reference to FIG. 10. Prior to a time T4, the locking device 107a of the connector 107 is in the locked state, and the contact of the relay 106 is in the conductive state. When, at the time T4, the locking device 107a is brought into the unlocked state, there no conduction anymore between the detection terminals 111a and 111b of the connector 107, and the detection signal dt takes on the "H" level.

Accordingly, the CPU 113 determines the change in the detection signal dt, and controls the contact of the relay 106 to take on the non-conductive state at a time T5 when the determination time t has elapsed. As a result, the power supply to the 48V load groups 108 from the second battery 105 is interrupted. Then, after the interruption of the power supply, the connector 107 is disengaged so as to be in the unconnected state (time T6).

Figure 11:
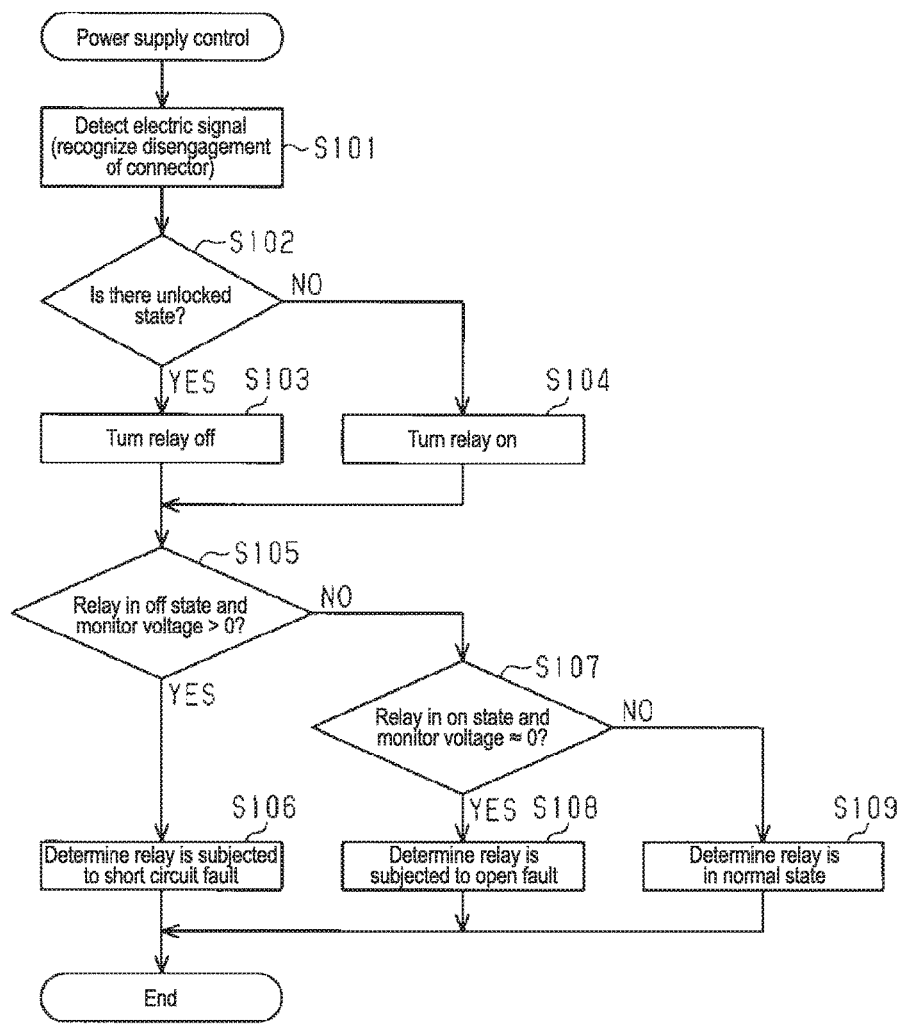
FIG. 11 is a flowchart illustrating an operation of the automobile power supply device.

FIG. 11 shows an operation of the power supply control unit 103 that is performed when the 48V load groups 108 are supplied with electric power from the second battery 105 via the plurality of connectors 107.

When the CPU 113 detects a change in the detection signal dt due to any one of the connectors 107 being disengaged (step S101), the CPU 113 determines whether or not there is conduction between the detection terminals 111a and 111b of all the connectors 107, that is, whether or not the locking devices 107a of all the connectors 107 are in the locked state (step S102).

If at least one of the connectors 107 is in the unlocked state, the power supply control unit 103 brings the contact of the relay 106 into the non-conductive state, and interrupts the supply of electric power to the 48V load groups 108 (step S103). At this time, the power supply control unit 103 brings the DC/DC converter 104 into a non-operating state.

Furthermore, if all the connectors 107 are in the locked state, the power supply control unit 103 brings the contact of the relay 106 into the conductive state, and supplies electric power to the 48V load groups 108 (step S104). At this time, the power supply control unit 103 brings the DC/DC converter 104 into an operating state.

Then, when the relay 106 is controlled to be in the non-conductive state, the CPU 113 detects a monitored voltage that is input to the abnormality detection circuit 114, and if the monitored voltage is not 0V, the CPU 113 determines that the contact of the relay 106 is subjected to a short-circuit fault (steps S105 and S106).

When, in step S105, the relay 106 is controlled to be in the conductive state, the procedure advances to step S107, and if the monitored voltage is in the vicinity of 0V, which is a voltage that is sufficiently lower than 48V, the CPU 113 determines that the contact of the relay 106 is subjected to an open fault (step S108).

Furthermore, if the monitored voltage is 0V in step S105, the procedure advances to step S107, and then if, in step S107, the monitored voltage is in the vicinity of 48V, the procedure advances to step S109, where the CPU 113 determines that the relay 106 is in a normal state.

Figure 10:
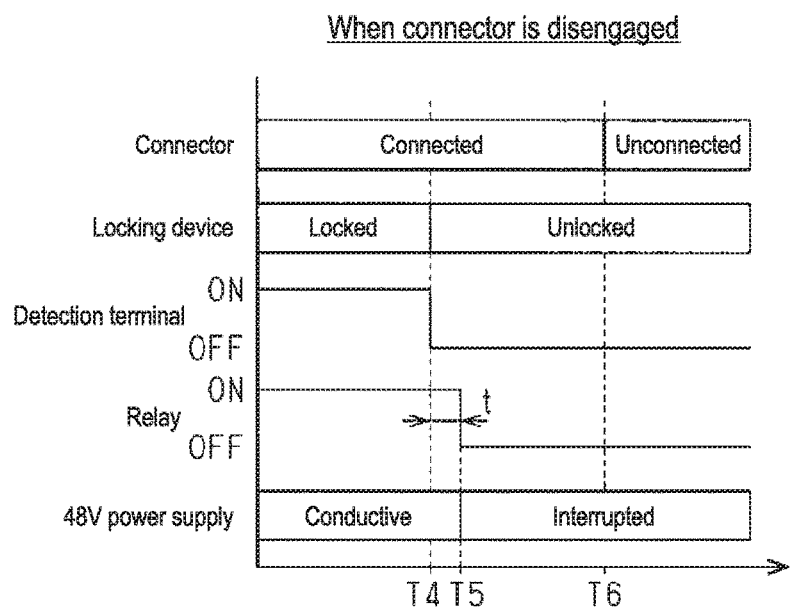
FIG. 10 is a timing chart illustrating an operation of the automobile power supply device.

The change in the detection signal dt at the time T4 in FIG. 10 is a preceding event that is performed prior to an event of switching the connector 107 from the connected state to the unconnected state (at a time T6 in FIG. 10). The signal detection circuit 112 can function as a preceding event sensor that detects this preceding event.

The automobile power supply device as described above can achieve the following effects.

1) When the 48V load group 108 and the second battery 105 are connected to each other via the connector 107, it is possible to prevent an arc from occurring.

2) When the connector 107 that connects the 48V load group 108 to the second battery 105 is disengaged, it is possible to prevent an arc from occurring.

3) The power supply control unit 103 can detect whether or not the locking device 107a of the connector 107 is in the locked state, and can bring the relay 106 that is interposed between the second battery 105 and the 48V load group 108 into the non-conductive state, prior to the connector 107 being disengaged. Accordingly, an operator does not need to perform a manual operation for preventing an arc from occurring, and thus it is possible to reliably prevent occurrence of an arc that may be caused when the operator has forgot to disengage the connector 107.

4) When the plurality of 48V load groups are supplied with electric power from the second battery 105 via one relay 106 and the plurality of connectors 107, the power supply control unit 103 can control the relay 106 to be in the conductive state if all the connectors 107 are detected to be in the locked state. Accordingly, when any one of the connectors 107 is disengaged, the supply of electric power to all the connectors 107 is interrupted, and thus it is possible to prevent an arc from occurring.

5) The power supply control unit 103 can detect a failure of the relay 106, by monitoring a voltage that is output from the relay 106 to the connectors 107 in accordance with the relay 106 being controlled to be open or closed.

Note that the second embodiment may be modified as follows.

Figure 7:
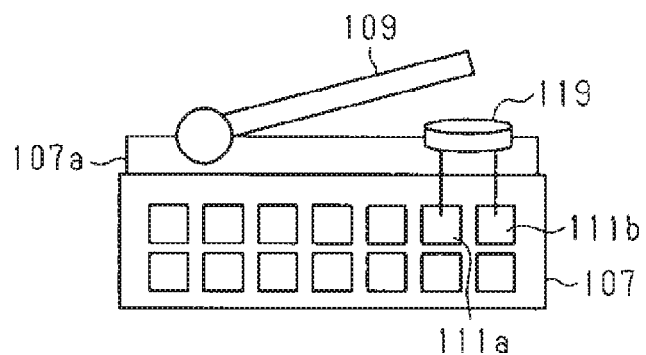
FIG. 7 is a diagram schematically illustrating another example of the locked-state detection unit.

As shown in FIG. 7, a configuration is also possible in which the detection piece 109 of the locking device 107a is pressed against a press button switch 119, establishing conduction between the detection terminals 111a and 111b.

In the second embodiment, the second battery 105 and the load groups 108 are not limited to the 48V, and one may also use a battery voltage that is larger than 30V and smaller than 60V.

In the example of FIG. 4, the connectors 107 are provided in the power supply wiring 120 between the power supply box 102 and the load groups 108. However, the connectors 107 may also be provided in a power supply wiring between the first battery 101 and the power supply box 102, or in a power supply wiring between the second battery 105 and the power supply box 102.

In the example of FIG. 4, a plurality of connectors 107 that respectively correspond to the plurality of load groups 108 are connected in parallel to an input/output terminal of the relay 106, but the numbers of the load groups 108 and the connectors 107 may be changed as appropriate.

The embodiments and the modifications may be appropriately combined, and a configuration of a part of one embodiment may be replaced by a configuration of a part of another embodiment, or may be added to another embodiment. The functions and effects that can be achieved by such replacement and/or addition can be understood by a person skilled in the art based on the disclosure of the specification and the drawings of the present invention.

The present invention is not limited to the exemplified examples. For example, the exemplified features are not to be construed as being essential for the present invention, and the subject matter of the present invention may be present in fewer features than all the features of the specific embodiments that are disclosed.

The invention claimed is:

1. An automobile power supply device in which a load group is supplied with electric power from a battery via opening and closing means and a connector, the automobile power supply device comprising:
- a locking device that is provided on the connector, and is configured to hold the connector in a connected state;
- a detection unit that is provided on the locking device, and is configured to detect an operation of the locking device; and
- a power supply control unit that is configured to control the opening and closing means to be in a conductive state based on a detection signal that is output from the detection unit.

2. The automobile power supply device according to claim 1, wherein the output voltage of the battery is larger than 36V and less than 60V.

3. The automobile power supply device according to claim 1,
wherein the detection unit is provided with a detection piece configured to establish conduction between detection terminals of the connector when the locking device operates, and
the power supply control unit is provided with:
- a signal detection circuit configured to detect conduction between the detection terminals; and
- a main control unit configured to control the opening and closing means to be in the conductive state based on the detection signal that is output from the signal detection circuit.

4. The automobile power supply device according to claim 3,
wherein a plurality of connectors are connected in parallel to an output terminal of the opening and closing means, and supply electric power to a plurality of load groups, and the main control unit controls the opening and closing means to be in the conductive state if a plurality of detection units of the plurality of connectors detect operations of locking devices at the same time.

5. The automobile power supply device according to claim 2, wherein the opening and closing means includes a relay whose contact is interposed between the battery and the connector.

6. The automobile power supply device according to claim 5, wherein the power supply control unit is provided with an abnormality detection unit configured to detect an abnormal operation of the relay based on an output voltage that is output when the relay is controlled to be open or closed.

7. The automobile power supply device according to claim 3, wherein the output voltage of the battery is larger than 36V and less than 60V.

8. The automobile power supply device according to claim 4, wherein the output voltage of the battery is larger than 36V and less than 60V.

9. The automobile power supply device according to claim 5, wherein the output voltage of the battery is larger than 36V and less than 60V.

10. The automobile power supply device according to claim 6, wherein the output voltage of the battery is larger than 36V and less than 60V.

11. The automobile power supply device according to claim 3, wherein the opening and closing means includes a relay whose contact is interposed between the battery and the connector.

12. The automobile power supply device according to claim 4, wherein the opening and closing means includes a relay whose contact is interposed between the battery and the connector.

* * * * *